(12) United States Patent  (10) Patent No.: US 7,549,662 B2
Righi et al.  (45) Date of Patent: Jun. 23, 2009

(54) BICYCLE CHANGE GEAR MECHANISM

(75) Inventors: Ermanno Righi, Modena (IT); Sandro Montanari, Formigine (IT)

(73) Assignee: F.S.A. S.r.l., Busnago (IT)

( * ) Notice: Subject to any disclaimer, the term of this patent is extended or adjusted under 35 U.S.C. 154(b) by 287 days.

(21) Appl. No.: 11/587,522

(22) PCT Filed: Apr. 29, 2005

(86) PCT No.: PCT/IB2005/001200

§ 371 (c)(1),
(2), (4) Date: Oct. 24, 2006

(87) PCT Pub. No.: WO2005/102829

PCT Pub. Date: Nov. 3, 2005

(65) Prior Publication Data

US 2007/0216130 A1  Sep. 20, 2007

(30) Foreign Application Priority Data

May 6, 2004  (IT)  .......................... MO2004A0107

(51) Int. Cl.
*B62M 1/00*  (2006.01)
*F16H 63/00*  (2006.01)
(52) U.S. Cl. ............................. 280/257; 474/80; 474/82
(58) Field of Classification Search .................. 280/257; 474/70, 80, 82
See application file for complete search history.

(56) References Cited

U.S. PATENT DOCUMENTS

| 3,181,383 | A | 5/1965 | Juy |
| 4,041,788 | A | 8/1977 | Nininger, Jr. |
| 4,469,479 | A | 9/1984 | Ozaki |
| 4,857,036 | A | 8/1989 | Romano |
| 5,890,979 | A | 4/1999 | Wendler |
| 6,676,549 | B1 | 1/2004 | Fukuda |
| 2001/0011809 | A1 | 8/2001 | Fukuda |
| 2002/0025868 | A1 | 2/2002 | Fukuda |
| 2002/0082128 | A1 | 6/2002 | Fukuda |
| 2004/0092347 | A1 | 5/2004 | Fukuda |

FOREIGN PATENT DOCUMENTS

| DE | 43 40 471 C1 | 2/1995 |
| EP | 0 075 927 A2 | 4/1983 |
| EP | 1 010 612 A1 | 6/2000 |
| FR | 1 277 691 | 12/1961 |

*Primary Examiner*—Paul N Dickson
*Assistant Examiner*—Marc A Scharich
(74) *Attorney, Agent, or Firm*—Pearne & Gordon LLP

(57) ABSTRACT

The bicycle gear mechanism, in particular a rear wheel change mechanism, comprises a derailleur provided with a drive chain guide element. The derailleur comprises: an arm (2); a first attachment element (5), rotatingly constrained to the arm (2) by a first shaft (3), the first attachment element (5) being predisposed to connect the arm (2) to the bicycle frame; a second attachment element (6), rotatably constrained to the arm (2), the second attachment element (6) being predisposed to connect the arm (2) to an element (7) predisposed to guide the drive chain (30) of the bicycle; a mechanism predisposed to rotatingly connect the first shaft (3) and the second shaft (4); at least an actuator, operatively connected to the arm (2) and the bicycle frame, which actuator is predisposed to rotate the arm (2) about the first shaft (3).

11 Claims, 5 Drawing Sheets

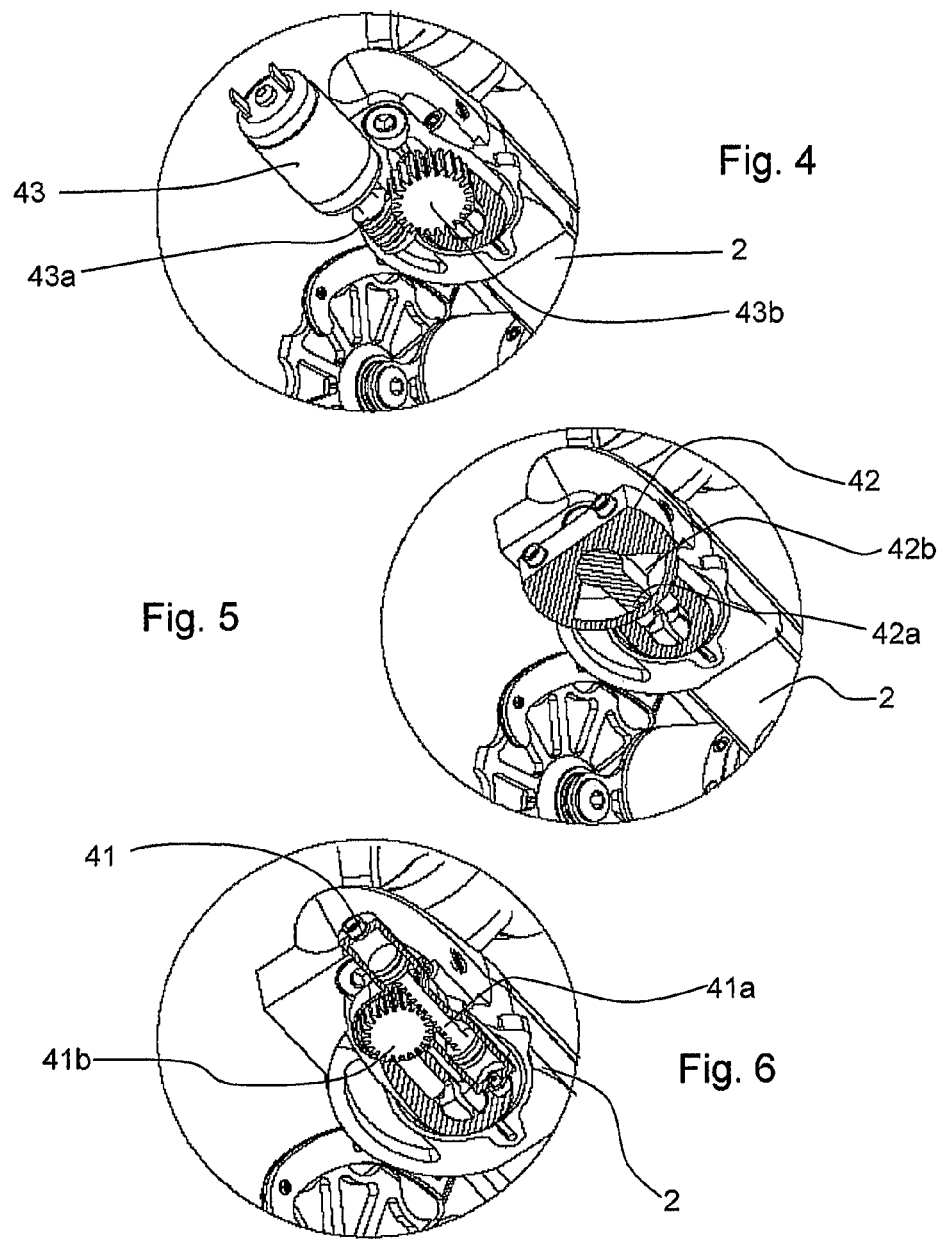

BICYCLE CHANGE GEAR MECHANISM

TECHNICAL FIELD

The invention relates to the field of gears, in particular those fitted on a rear wheel of a bicycle.

BACKGROUND ART

Known-type bicycle gears comprise a derailleur provided with an element for guiding a bicycle transmission chain. The derailleur is connected to the frame of the bicycle and is predisposed to rotate, on command, with respect to the bicycle frame in order to translate the chain between a plurality of coaxial gears on a wheel of the bicycle, in a parallel direction to the rotation axis of the gears.

The derailleur is typically constituted by a four-bar hinge in which two parallel sides are defined respectively by a connection element to the bicycle frame and an element to which the chain guide element is connected. The two arms of the four-bar hinge, which connect the frame connection element and the chain guide element, are arranged in order to allow displacements of the chain guide element in a transversal direction with respect to the drive chain. The chain guide element is defined by a cage which supports two cogwheels lying on a plane that is perpendicular to the rotation axis of the gears. The drive chain, when exiting from the gears, enmeshes on the two cogwheels, following a path which crosses the plane containing the rotation axes of the cogwheels themselves. The element can rotate on the plane on which the cogwheels lie with respect to the four-bar hinge and is provided with elastic means which generate a couple that keeps the chain under a constant tension. The function of the four-bar hinge is to guarantee that the guide element of the drive chain can displace parallel to itself with respect to the bicycle frame. In particular, the chain guide element displaces, maintaining a constant orientation of the connection element with the bicycle frame.

The displacements of the chain guide element are determined by means of a cable connected by an end thereof to at least one of the arms of the four-bar hinge, and connected at another end thereof to a command, usually associated to the bicycle frame, which enables the cable to be pulled or released. By creating traction on the cable a rotation of the arms of the four-bar hinge is determined with respect to the relative hinging points with the connection element, while on releasing the tension on the cable, a spring induces an opposite rotation of the arms.

Known-type gear changes exhibit some drawbacks.

When the derailleur is connected to the bicycle frame, the orientation of the chain guide element of the chain is constant for all the positions assumed by the four-bar hinge. This is a big limitation, as the chain thus assumes, with respect to the bicycle frame, considerably different inclinations depending on the gear it is engaged on. The guide element must therefore be very accurately sized and positioned in order to prevent the chain, in some inclinations, from dragging against portions of the support cage of the cogwheels. Variations in the position of the gear cogs, errors in derailleur mounting, displacements due to impacts or other accidental occurrences very easily compromise the correct functioning of the gear changing mechanism if the orientation and position of the chain guide element are wrong. All of this happens because the position of the chain guide element cannot be changed with respect to the connection element of the gear change to the bicycle frame. To change this orientation of the chain guide element it is necessary to reposition the frame connection element.

The main aim of the present invention is to provide a bicycle gear change which obviates the limitations in the prior art.

An advantage of the gear change is that the chain guide element can be oriented, with respect to the bicycle frame, independently of the fixing of the derailleur to the frame, and can also be oriented continuously according to the position assumed by the derailleur, so that an optimal position is always obtained for each inclination assumed by the bicycle transmission chain.

A further advantage of the gear change of the invention is that it is considerably quieter than a traditional type gear change.

A further advantage of the gear change of the invention is that it is more reliable and precise in operation than a known-type gear change.

DISCLOSURE OF INVENTION

Further characteristics and advantages will better emerge from the following detailed description of a gear change for a bicycle, made herein below with reference to the accompanying figures of the drawings, given purely by way of a non-limiting example, in which:

FIG. 4, 5, 6 show details of three further embodiments of the gear change of FIG. 1;

Figure 1:
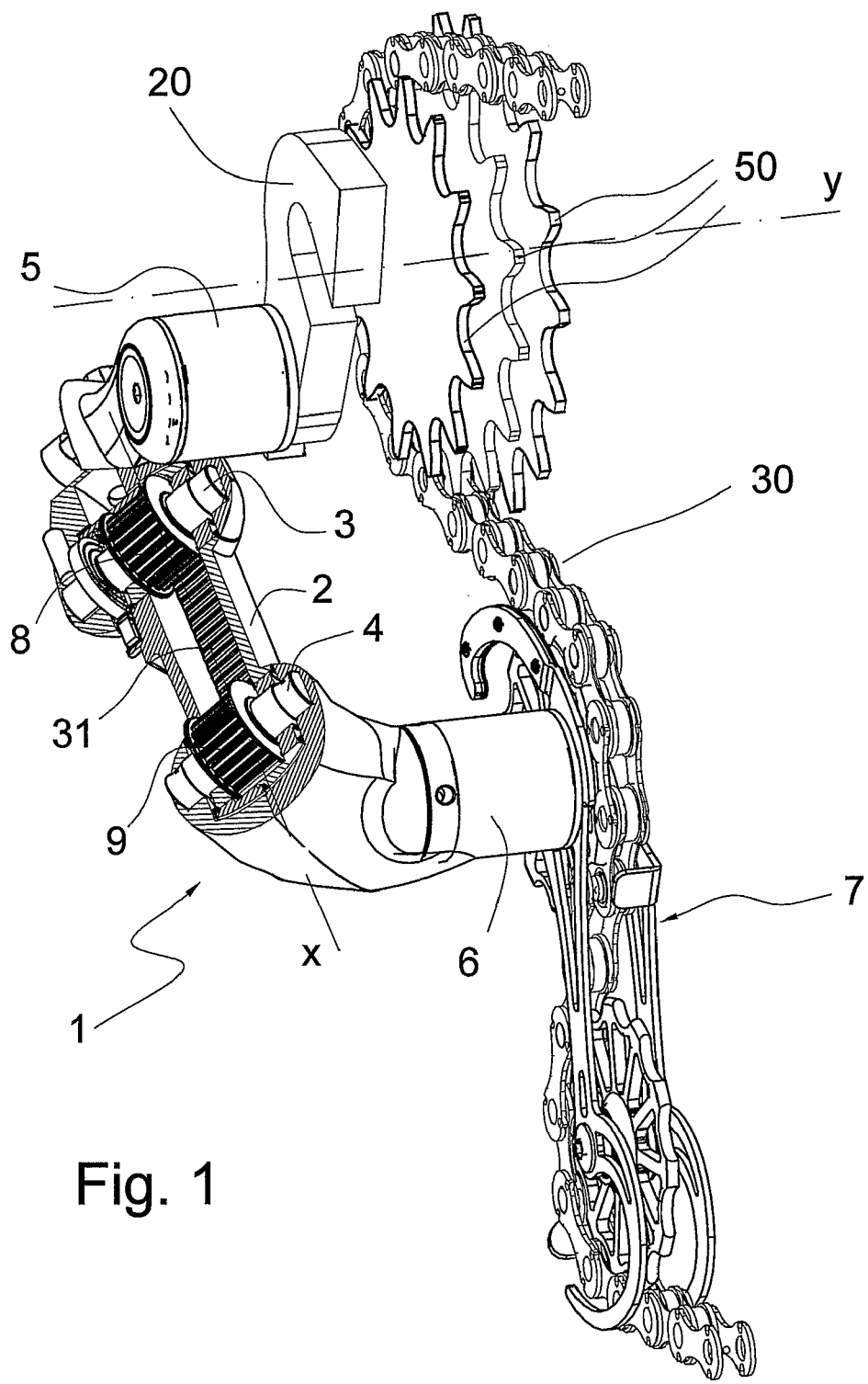
FIG. 1 is a perspective view in partial section of a gear change of the present invention.
Figure 2:
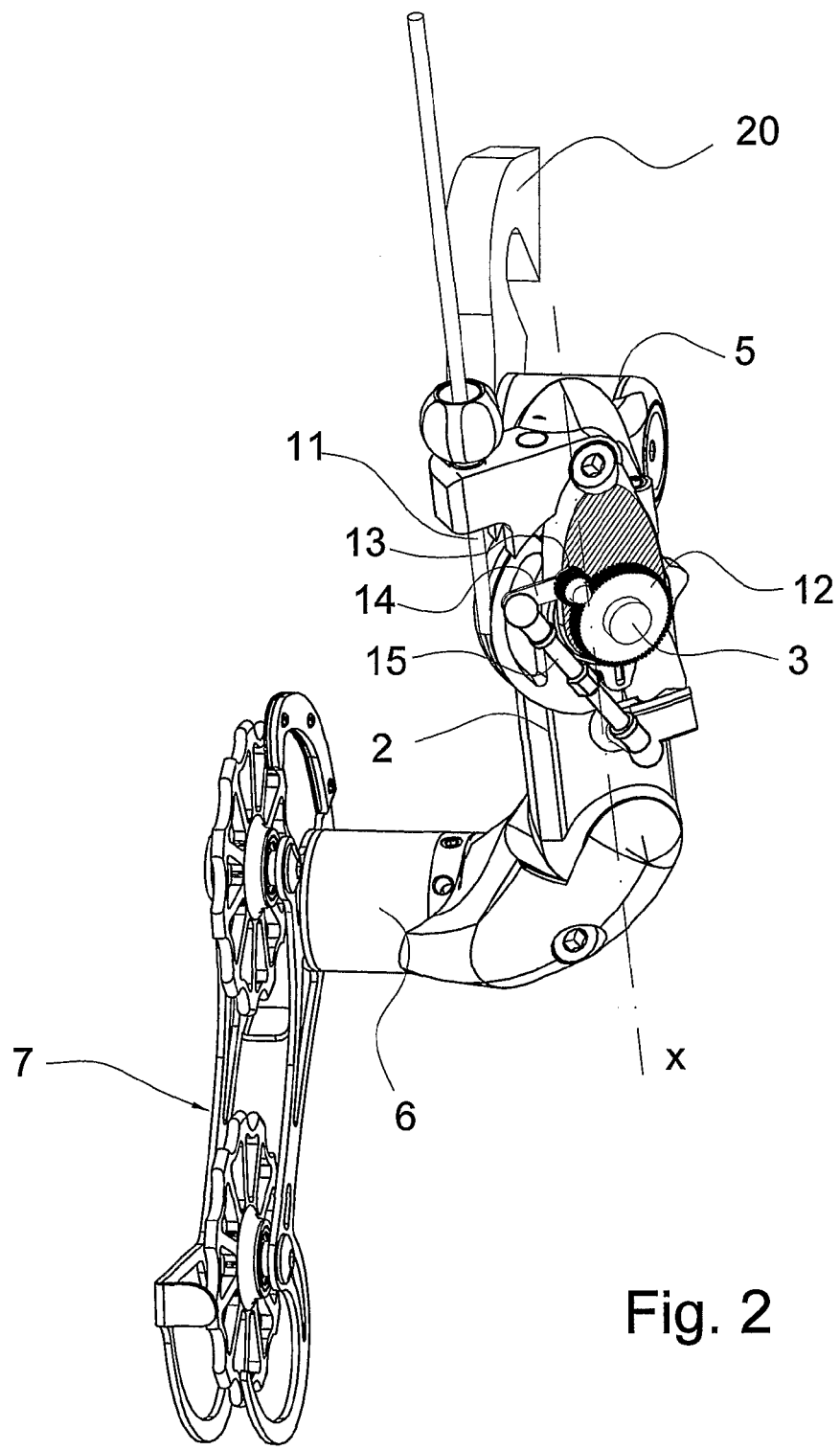
FIG. 2 is a second perspective view in partial section of the gear change of FIG. 1.
Figure 3:
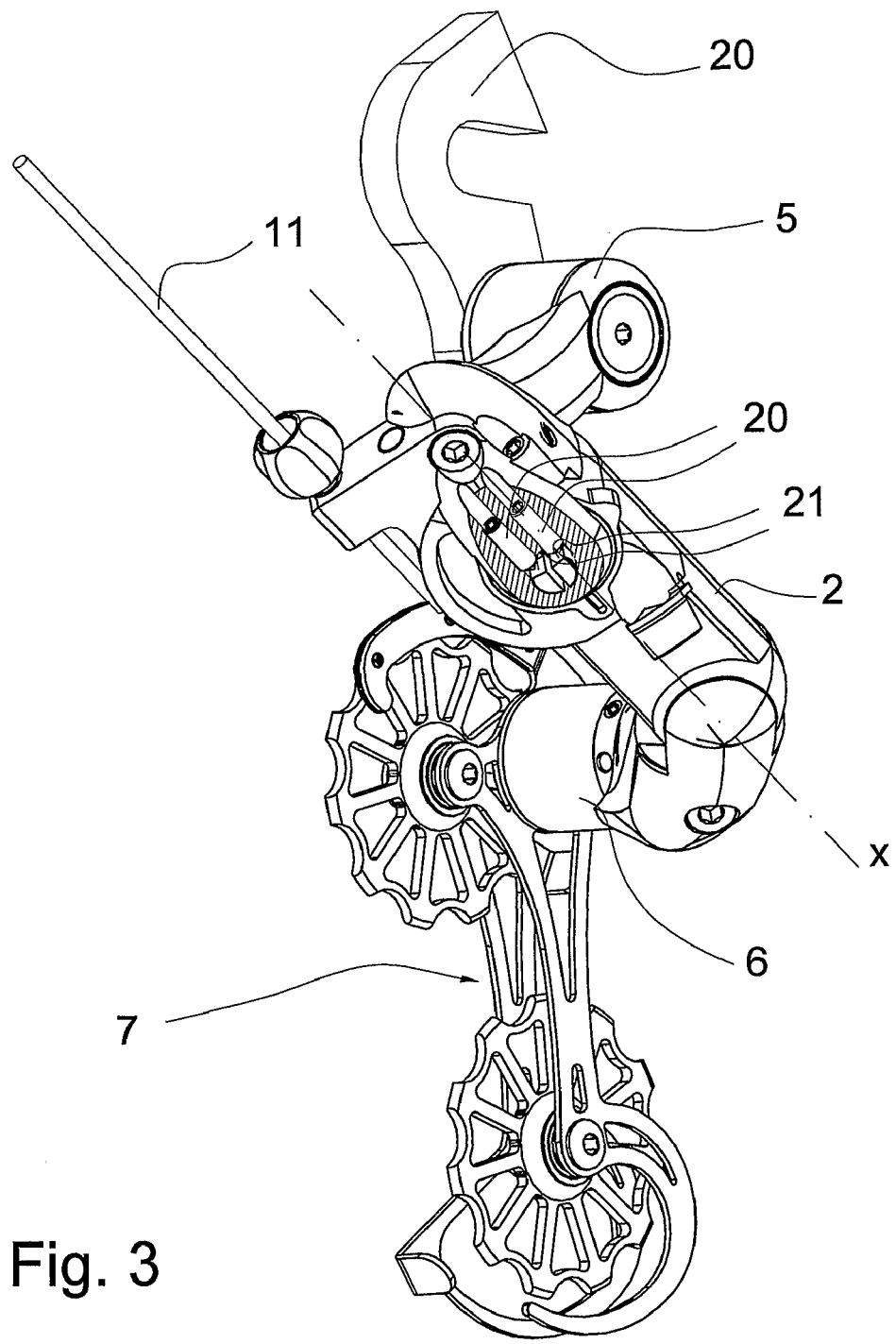
FIG. 3 is a third perspective view in partial section of the gear change of FIG. 1.
Figure 7:
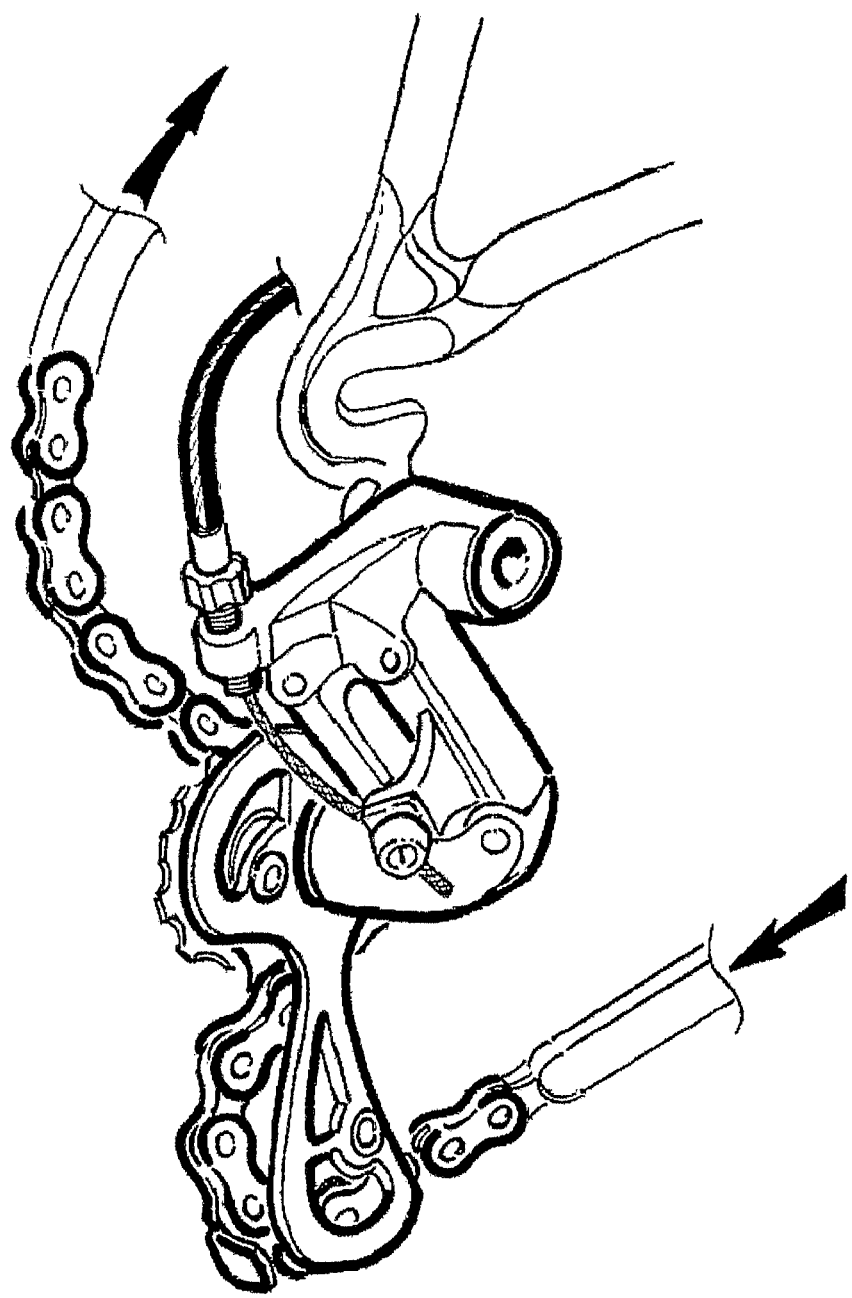
FIG. 7 is a gear change of known type.

With reference to the figures of the drawings, the bicycle gear change of the present invention comprises a derailleur 1 provided with an element 7 for guiding a drive chain 30 of a bicycle. The derailleur 1 is predisposed to translate on command in a parallel direction to the rotation axis y of a plurality of gears 50, which gears are coaxial to a wheel of the bicycle, in order to translate the drive chain among the various gears. The element 7 is defined by a cage which supports two adjacent cogwheels on plane which is perpendicular to the rotation axis y of the gears 50. The chain 30, exiting from the gears 50, enmeshes on the two cogwheels, following a path which crosses the plane containing the rotation axes of the cogwheels themselves. The chain drive element 7 can rotate with respect to the derailleur on the plane on which the cogwheels lie, and is provided with elastic means which generate a couple which is such as to maintain the drive chain 30 constantly under tension.

The derailleur comprises an arm 2 which exhibits an overall elongate form and has a longitudinal axis x. A first attachment element 5 is rotatingly constrained to the arm 2 by a first shaft 3 which is rotatable, on command, with respect to the first attachment element 5. The first attachment element 5 is predisposed to connect the arm 2 to the bicycle frame, by means of a connection element 20. A second attachment element 6 is rotatingly constrained to the arm 2 by means of a second shaft 4, which is parallel to the first shaft 3 and solidly constrained to the second attachment element 6. The second attachment element 6 is predisposed to connect the arm 2 to the chain guide element 7 of the bicycle. Preferably the first shaft 3 and the second shaft 4 are aligned along the longitudinal axis x of the arm 2. The derailleur further comprises a mechanism, predisposed for mechanically rotatingly connecting the first shaft 3 and the second shaft 4, and at least an actuator, operatively connected to the arm 2 and to the bicycle frame, predisposed to rotate the arm 2 about the first shaft 3.

The mechanism, predisposed to rotatingly connect the first shaft 3 and the second shaft 4, comprise a first gear 8, solidly constrained and coaxial to the first shaft 3, and a second gear 9, solidly constrained and coaxial to the second shaft 4. Means for transmission are also included and predisposed to mechanically connect the first gear 8 and the second gear 9. In the preferred embodiment, the means for transmission comprise a cogged belt 31 which enmeshes on the first and second gear 8, 9. Other possible solutions for the means for transmission, not illustrated in the figures of the drawings, can be constituted by a linked chain or a gear train arranged between the first and second gears.

The gear change of the invention functions as follows. The first shaft 3, in the absence of a command, and the second shaft 4 are solid in rotation with respect to the first attachment element 5 and the second attachment element 6. A rotation of the arm 2 about the first shaft 3 leads to a rotation of the second shaft 4 about the first shaft 3. As the first shaft 3 and the second shaft 4 are mechanically connected in rotation by the first and the second gears 8, 9, and also by the cogged belt 31, and since in the absence of predetermined commands the first shaft 3 is solid in rotation to the first attachment element 5 which, in turn is solidly constrained to the bicycle frame, the rotation of the second shaft 4 about the first shaft 2 happens contemporaneously with a rotation of the second shaft 4 about its own longitudinal axis, an opposite rotation with respect to the rotation of the arm 2. If the gear ratio between the first gear 8 and the second gear 9 is one, the rotation the second shaft 4 will make about its longitudinal axis is equal and opposite to the rotation the second shaft 4 will make, and also obviously the arm 2, about the first shaft 3. A consequence of this is that any diameter of the second shaft 4 is displaced parallel to itself. Since the second attachment element 6 is solidly constrained to the second shaft 4, the second attachment element 6 translates parallel to itself by rotations of the arm 3 about the first shaft 3. The described mechanism is basically equivalent to a four-bar hinge having arms pivoted to the two attachment elements.

In the preferred embodiment of the gear change the first shaft 3 is solidly constrained to the first attachment 5 with respect to a rotation or the arm 2 and is rotatable with respect to the first attachment 5 on command. By means of a mechanism of known type it is possible, on command, to calibrate the angular position of the first shaft 3 with respect to the longitudinal axis thereof. If the arm 2 is still, a rotation of the first shaft 3 about the longitudinal axis thereof induces a same-direction rotation of the second shaft about a longitudinal axis thereof, which is equal if the first and second gears 9 have a one-one ratio. In this way the orientation of the second attachment 6 with respect to the first attachment 5 can be adjusted.

The mechanism for the calibration of the angular position of the first shaft 3 can be defined for example by two parallel screws 20 which are perpendicular with respect to the rotation axis of the first shaft 3. The screws 20 at one end interact with two surfaces 21 solidly constrained to the first shaft 3 and perpendicular to the screws 20. The screws 20, when screwed in, press on a surface 20. When a screw is unscrewed and another screwed in, the first shaft 3 is rotated about the axis thereof. By screwing in both screws 20 the first shaft 3 is blocked in position.

Advantageously the first shaft 3, in a second embodiment of the gear change, is rotatable with respect to the first attachment 5 and is mechanically connected to the arm 2 so that, by rotation of the arm 2 about the first shaft 3, the first shaft 3 rotates with respect to the first attachment 5 in a determined transmission ratio. The first shaft 3 is mechanically connected to the arm 2 in the following way.

A first sprocket 12 is solidly constrained and coaxial to the first cogwheel 8. A second sprocket 13 is rotatingly constrained to the first attachment 5 and enmeshes with the first sprocket 12. The second sprocket 13 is also solidly constrained to a lever 14 which is solid in rotation with the second sprocket 13 about the rotation axis of the second sprocket 13. The lever 14 is connected to the arm 2 by a rod 15 which, at ends thereof, is rotatingly constrained to the lever 14 and the arm 2.

In the second embodiment of the gear change the first shaft 3 is rotatingly constrained to the first attachment element 5. A rotation of the arm 2 induces, through the rod 15 and the lever 14, a rotation of the second sprocket 13 which in turn induces a rotation of the first sprocket 12. The first sprocket 12 is solidly constrained and coaxial to the first cogwheel 8 and thus the first shaft 3, thus the first shaft 3 rotates solidly with the first sprocket 12. The rotation of the first shaft 3 induces, as described above, a same-direction rotation of the second shaft 4. The practical effect of this rotation of the second shaft 4 is that the second attachment element 6 assumes a different inclination with respect to the first attachment 5 on a perpendicular plane to the longitudinal axes of the first and second shafts 3, 4. It is therefore possible to controlledly change the inclination of the second attachment element 6 depending on the angular position assumed by the arm 2 with respect to the first shaft 3.

This possibility offered by the gear change of the present invention offers a very important advantage: let us consider a perpendicular plane to the rotation axes of the first and second shafts 3 and 4 and fix a longitudinal axis a of the first attachment element 5, which as mentioned is solidly constrained to the bicycle frame, and a longitudinal axis b of the second attachment element 6. The inclination between the two longitudinal axes a, b varies proportionally to the inclination of the longitudinal axis x of the arm 2 with respect to the longitudinal axis a of the first attachment element 5. As is known, the transmission chain 30 of the bicycle is arranged with variable inclinations with respect to the longitudinal axis a of the first attachment element 5 according to the gear 50 and the clanger to which it is attached. In gear changes of known type the chain 30 is arranged with variable inclinations also with respect to the element 7 supported by the second attachment element 6 so that, for determined inclinations of the chain 30, there is dragging between the chain 30 and parts of the element 7. Thanks to the possibility of varying the inclination of the second attachment element 6 with respect to the first attachment element 5, in the gear change of the present invention the element 7 can be forced to position in such a way as to maintain, for each position of the arm 2, the same inclination with respect to the chain 30.

In a preferred embodiment of the gear change, the actuator predisposed to rotate the arm 2 about the first shaft 3 comprises a cable 11, which at an end is constrained to the arm 2 and at the other end is connected to a command which is predisposed to exert a traction force on the cable 11, and elastic means predisposed to exert a force on the arm 2 which is oppositely directed to the force exerted on the cable 11. This solution, which can be defined "traditional", means that by acting on a command associated to the handlebars of the bicycle the cable 11 can be pulled or loosened with respect to the arm 2. By acting in traction on the cable 11, the arm 2 moves, translating the drive chain 30 from a smaller-diameter gear to a larger-diameter gear. By loosening the cable 11, the elastic means, typically springs arranged between the arm 2 and the bicycle frame or the first attachment element 5, push the arm 2 in an opposite direction to before.

In a preferred embodiment, illustrated in FIG. 6, the actuator predisposed to rotate the arm 2 about the first shaft 3 comprises a double-acting cylinder 41 which is solidly constrained to the first attachment element 5. The stem 41*a* of the piston of the cylinder 41 bears a straight cogging which enmeshes with a cogwheel 41*b* solidly constrained to the arm 2 and concentric with respect to the first shaft 3, in such a way that a translation of the stem 41*a* induces a rotation of the arms 2 about the first shaft 3 by effect of the enmeshing between the straight cogging and the cogwheel 41*b* solidly constrained to the arm 2. The run of the piston in the direction corresponding to the rotation of the arm 2 translating the chain 30 towards the larger diameters of the gears 50 is powered by a fluid pressurised by a command, of known type and not illustrated in the figures, associated to the handlebars of the bicycle, while the opposite run can be performed by a spring or by the fluid itself which, by means of a distributor, is sent under pressure to the corresponding chamber of the cylinder.

In a further embodiment, illustrated in FIG. 5, the actuator predisposed to rotate the arm 2 about the first shaft 3 comprises a rotary hydraulic actuator, in other words a cam 42. The cam 42 is defined by a chamber 42*a*, which exhibits a circular crown sector which is concentric to the first shaft 3 and made in a portion which is solidly constrained to the first attachment element 5, and by a dividing wall 42*b*, which is solidly constrained to the arm 2, and which rotates sealedly inside the chamber 42*a* about the first shaft 3. The rotation of the dividing wall 42*b* within the chamber 42*a* is performed by means of a fluid which is sent under pressure from one side or another of the dividing wall 42*b* by a command of known type associated to the bicycle handlebars.

In a third preferred embodiment, illustrated in FIG. 4, the actuator for rotating the arm 2 about the first shaft 3 comprises an electric gear reducer 43 which comprises a drive worm screw 43*a* that enmeshes with a cogwheel 43*b* solidly constrained to the arm 2 and concentric with respect to the first shaft 3, so that a rotation of the worm screw 43*a* induces a rotation of the arm 2 about the first shaft 3 by effect of the enmeshing between the worm screw 43*a* and the cogwheel 43*b* solidly constrained to the arm 2. The gear reducer is powered by a battery which is not illustrated.

The gear change for a bicycle of the present invention offers important advantages.

A first of these advantages is that the chain guide element can be oriented with respect to the bicycle frame independently of the fastening of the derailleur to the bicycle frame, and can also be oriented continuously in relation to the position assumed by the derailleur, so as to assume an optimal position for each inclination of the bicycle drive chain. This characteristic, apart from guaranteeing a particularly quiet functioning of the change, considerably simplifies the mounting of the derailleur as it is always possible to adjust the position of the chain guide element after mounting, meaning that there is no special care needed in the fastening of the first connection element to the bicycle frame.

The invention claimed is:

1. A bicycle gear mechanism, comprising a derailleur provided with a drive chain guide element, the derailleur being predisposed to rotate on command with respect to a bicycle frame in such a way as to translate a drive chain between a plurality of gears which are coaxial to a wheel of the bicycle, in a parallel direction to a rotation axis of the gears, wherein the derailleur (1) comprises: an arm (2) which exhibits an elongate shape and which has a longitudinal axis (x); a first attachment element (5), rotatingly constrained to the arm (2) by a first shaft (3) which is rotatable on command with respect to the first attachment element (5), the first attachment element (5) being predisposed to connect the arm (2) to the bicycle frame; a second attachment element (6), rotatably constrained to the arm (2) by a second shaft (4) which is parallel to the first shaft (3) and solidly constrained to the second attachment element (6), the second attachment element (6) being predisposed to connect the arm (2) to the drive chain guide element to guide the drive chain of the bicycle; a connecting mechanism predisposed to rotatingly connect the first shaft (3) and the second shaft (4); and at least an actuator, operatively connected to the arm (2) and the bicycle frame, which actuator is predisposed to rotate the arm (2) about the first shaft (3).

2. The gear mechanism of claim 1, wherein the connecting mechanism, predisposed to rotatingly connect the first shaft (3) and the second shaft (4), comprises a first gear (8), solidly constrained and coaxial to the first shaft (3); a second gear (9), solidly constrained and coaxial to the second shaft (4); and means for transmission, predisposed to mechanically connect the first gear (8) and the second gear (9).

3. The gear mechanism of claim 2, wherein the means for transmission, predisposed to mechanically connect the first gear (8) and the second gear (9), comprise a cogged belt (31).

4. The gear mechanism of claim 1, wherein the first shaft (3) is solidly constrained to the first attachment element (5) with respect to a rotation of the arm (2) and, on command, the first shaft (3) is rotatable with respect to the first attachment element (5).

5. The gear mechanism of claim 1, wherein the first shaft (3) is rotatable with respect to the first attachment element (5) and is mechanically connected to the arm (2) so that, for rotations of the arm (2) about the first shaft (3), the first shaft (3) rotates with respect to the first attachment element(5) in a determined transmission ratio.

6. The gear mechanism of claim 2, wherein the first shaft (3) is mechanically connected to the arm (2) by a first sprocket (12), which first sprocket (12) is solidly constrained and coaxial to a first cogwheel, a second sprocket (13) being rotatingly constrained to the first attachment element (5), which first enmeshes with the first sprocket (12) and is solidly constrained to a lever (14), the lever (14) being solidly rotatable with the second sprocket (13) about a rotation axis of the second sprocket (13), the lever (14) being connected to the arm (2) by a rod (15) which, at ends thereof, is rotatingly constrained to the lever (14) and to the arm (2).

7. The gear mechanism of claim 1, wherein the at least an actuator, predisposed to rotate the arm (2) about the first shaft (3), comprises: a cable (11) which at an end is constrained to the arm (2) and at another end is connected so as to be responsive to a command which can exert a traction force on the cable (11); and elastic means being predisposed to exert a force on the arm (2) which opposes the force exerted by the cable.

8. The gear mechanism of claim 1, wherein the at least an actuator, predisposed to rotate the arm (2) about the first shaft (3), comprises a double-acting cylinder (41) solidly constrained to the first attachment element (5), a stem (41*a*) of which cylinder (41) bears a straight cogging which enmeshes with a cogwheel (41*b*) solidly constrained to the arm (2) and concentric with respect to the first shaft (3), in such a way that a translation of the stem (41*a*) induces a rotation of the arm (2) about the first shaft (3) by effect of the enmeshing between the straight cogging and the cogwheel (41*b*) solidly constrained to the arm (2).

9. The gear mechanism of claim 1, wherein the at least an actuator, predisposed to rotate the arm (2) about the first shaft (3), is a rotary hydraulic actuator having a cam (42), defined by a chamber (42a) which is circular-crown shaped concentric to the first shaft (3) and is afforded in a portion which is solidly constrained to the first attachment element (5), and by a dividing wall (42b), solidly constrained to the arm (2) which rotates sealedly within the chamber (42a) about the first shaft (3).

10. The gear change mechanism of claim 1, wherein the actuator predisposed to rotate the arm (2) about the first shaft (3) comprises an electric gear reducer (43) which comprises a drive worm screw (43a) which enmeshes with a cogwheel (43b) solidly constrained to the arm (2) and concentric with respect to the first shaft (3), so that a rotation of the worm screw (43a) induces a rotation of the arm (2) about the first shaft (3) by effect of the enmeshing between the worm screw (43a) and the cogwheel (43b) solidly constrained to the arm (2).

11. The gear mechanism of claim 5, wherein the first shaft (3) is mechanically connected to the arm (2) by a first sprocket (12), which first sprocket (12) is solidly constrained and coaxial to a first cogwheel, a second sprocket (13) being rotatingly constrained to the first attachment element (5), which first enmeshes with the first sprocket (12) and is solidly constrained to a lever (14), the lever (14) being solidly rotatable with the second sprocket (13) about a rotation axis of the second sprocket (13), the lever (14) being connected to the arm (2) by a rod (15) which, at ends thereof, is rotatingly constrained to the lever (14) and to the arm (2).

\* \* \* \* \*